United States Patent [19]

Bard

[11] Patent Number: 4,686,361
[45] Date of Patent: Aug. 11, 1987

[54] JOYSTICK CONTROL UNIT

[76] Inventor: Arnold D. Bard, 1049 Stratton Pl., Elberon, N.J. 07740

[21] Appl. No.: 757,204

[22] Filed: Jul. 22, 1985

Related U.S. Application Data

[63] Continuation-in-part of Ser. No. 459,772, Mar. 8, 1983, abandoned.

[51] Int. Cl.$^4$ .................... G01B 11/26; G01D 5/30
[52] U.S. Cl. .................... 250/221; 250/229
[58] Field of Search .................... 250/221, 353, 211 K, 250/227, 229; 33/1 M; 340/709, 365 P; 356/152

[56]       References Cited
       U.S. PATENT DOCUMENTS

| | | | |
|---|---|---|---|
| 3,432,671 | 3/1969 | Edmonds | 356/152 X |
| 3,811,047 | 5/1974 | Shragel | 250/221 X |
| 3,881,106 | 4/1975 | Pocker et al. | 250/221 X |
| 3,886,544 | 5/1975 | Narodny | 250/227 |
| 4,459,022 | 7/1984 | Morey | 250/221 X |
| 4,480,184 | 10/1984 | Ely | 250/227 |

OTHER PUBLICATIONS

"Miniature Two-Axis Joystick Controller"; Nasa Tech Briefs, Fall 1982.

Primary Examiner—Edward P. Westin
Attorney, Agent, or Firm—Lieberman, Rudolph & Nowak

[57] ABSTRACT

The invention relates to a joystick control unit featuring a joystick shaft member with a reflective surface on its bottom portion which is parallel to the X-Y plane when the shaft is placed in a centered upright position. The reflective surface tilts as the shaft member is moved through the X-Y plane and reflects the radiant energy emitted from a source mounted beneath the shaft member and directs it towards a plurality of radiant energy detectors selectively arranged beneath the reflective surface. The shaft member includes a movable inner member with at least one aperture in an upstanding sidewall which selectively permits or prevents the transmission of radiant energy through the aperture for purposes of controlling a switch function.

8 Claims, 9 Drawing Figures

JOYSTICK CONTROL UNIT

This application is a continuation-in-part, of application Ser. No. 459,772, filed Mar. 8, 1983, now abandoned.

FIELD OF THE INVENTION

This invention relates to a manually operated control device and more particularly to a joystick control system for controlling the position or movement of an object, or video image, capable of movement in any direction in a plane.

BACKGROUND OF THE INVENTION

Joystick control systems have been widely used in a variety of applications where it has been required to move an object in a plane. Such applications include systems for controlling the movement of mechanical devices, such as tracked vehicles or wheelchairs to the widely used systems for controlling the position or movement of a visual image on the face of a CRT.

In general, the known joystick control system can be divided into two types. The first is an electrical contact system wherein the mechanical movement of the joystick is converted into electrical control signals via a series of electrical contacts or switches. The second is a potentiometer type system wherein a potentiometer, moveable in conjunction with the joystick, is positioned on at least two axis of rotation and the chaning resistance of the potentiometers generate electrical control signals.

The systems which utilize electrical contacts, or in some cases electrical switches, suffer from several disadvantages. First is the limited life of any electrical contact resulting from a dirty environment, shock and misalignment. This problem is particularly acute in the exploding video game industry wherein overzealous video game jockeys, enthralled with the "action" on the screen, routinely destroy joustick controllers resulting in expensive replacement costs and excessive downtime for the video game.

Another problem with such devices is their inherent nonlinear nature. That is, changes in position of the joystick are communicated to associated control circuitry as contact is made with a plurality of separate contacts or switches. A small number of separate contacts or switches has the advantage of low cost and increased reliability, but the large changes in movement between successive contacts results in sudden and jerky movement of the object or visual image being controlled. Alternatively, use of a large number of contacts, or switches, will "smooth out" the action, but this, of course, raises the cost of the device and reduces its reliability due to the increase in possible points of failure.

It is, therefore, another object of the instant invention to provide a low cost joystick control system without the inherent disadvantages of known electrical contact systems.

It is another object of the instant invention to provide a joystick control system with increased proportionality between joystick movement and movement of the object being controlled without increasing the costs, or reducing the reliability of the control system.

Potentiometer type joysticks are preferred in that they provide a continuous control signal rather than discrete signal changes as are inherent with contact type joysticks. For this reason, potentiometer type joysticks are generally used in more expensive and complicated systems for controlling the movement of images on a CRT. Although potentiometer type systems overcome some of the problems associated with electrical contact syste, they still have inherent disadvantages. The foremost disadvantage is the cost of the potemtiometers, the additional moving parts and attendant lower reliability. Also, of course, any potentiometer is vulnerable to a dirty environment which can make the control system unworkable.

It is, therefore, a still further object of the instant invention to provide a joystick control system that does not require the use of potentiometers for operation.

It is still another object of the instant invention to provide a high quality, low cost, joystick control system that is highly reliable and readily manufactured for a wide variety of applications.

SUMMARY OF THE INVENTION

In accordance with various aspects and features of the invention, a joystick control unit includes a joystick shaft member having a reflective surface on a bottom portion of the shaft member.

It is a feature of the invention that a radiant energy source is mounted directly beneath the reflective surface and the reflective surface operates to reflect energy from the radiant energy source.

It is another feature of the invention that the reflective surface is parallel to a particular X-Y plane when the joystick shaft member is in a centered upright position and tilts as an upper portion of the joystick shaft member is moved through the particular X-Y plane.

It is still another feature of the invention that a plurality of radiant energy detectors are arranged in selective positions beneath the reflective surface so that selected different ones of the radiant energy detectors receive varying amounts of radiant energy as the hightly reflective surface is tilted.

It is still another feature of the invention that the changes in radiant energy received by the radiant energy detectors are utilized to generate control signals which in turn define the position of an object wihtin an X-Y plane, or the position of a visual image on the face of a CRT.

It is a still further feature of the invention that a separate switch control is provided for the joystick control unit to control, for example, separate functions such as "fire buttons". In accordance with this aspect of the invention the upper portion of the joystick shaft member comprises a hollow body with upstanding sidewalls, at least one aperture in said upstanding side walls, a moveable member included within the hollow body and a radiant energy source for directing radiant energy through the aperture. The moveable member is selectively operable to prevent or permit the passage of radiant energy through the aperture to provide the switch function.

It is another feature of the invention that the reflective surface may comprise at least first and second reflective areas, each reflective area varying in reflectivity from a first level of reflectivity in one portion of the reflective area, to a second level of reflectivity in another portion of the reflective area, said first level of reflectivity being greater than said second level of reflectivity. Utilization of the reflective areas in accordance with this aspect of the invention provides the advantages inherent in potentiometer type joysticks without the disadvantages of unreliability and high cost.

These and other objects and features of the invention will be more fully appreciated from the following detailed description when taken in conjunction with the accompanying drawings.

DETAILED DESCRIPTION

The joystick control system of the instant invention operates in accordance with a principal substantially different from the operating principles of the known joystick control systems previously discussed. The system described herein utilizes a light source and photodetector eliminiate the problems inherent in electrical contact systems, does not require a potentiometer, yet provides a highly reliable, easily manufactured and low cost joystick control device.

Figure 1:
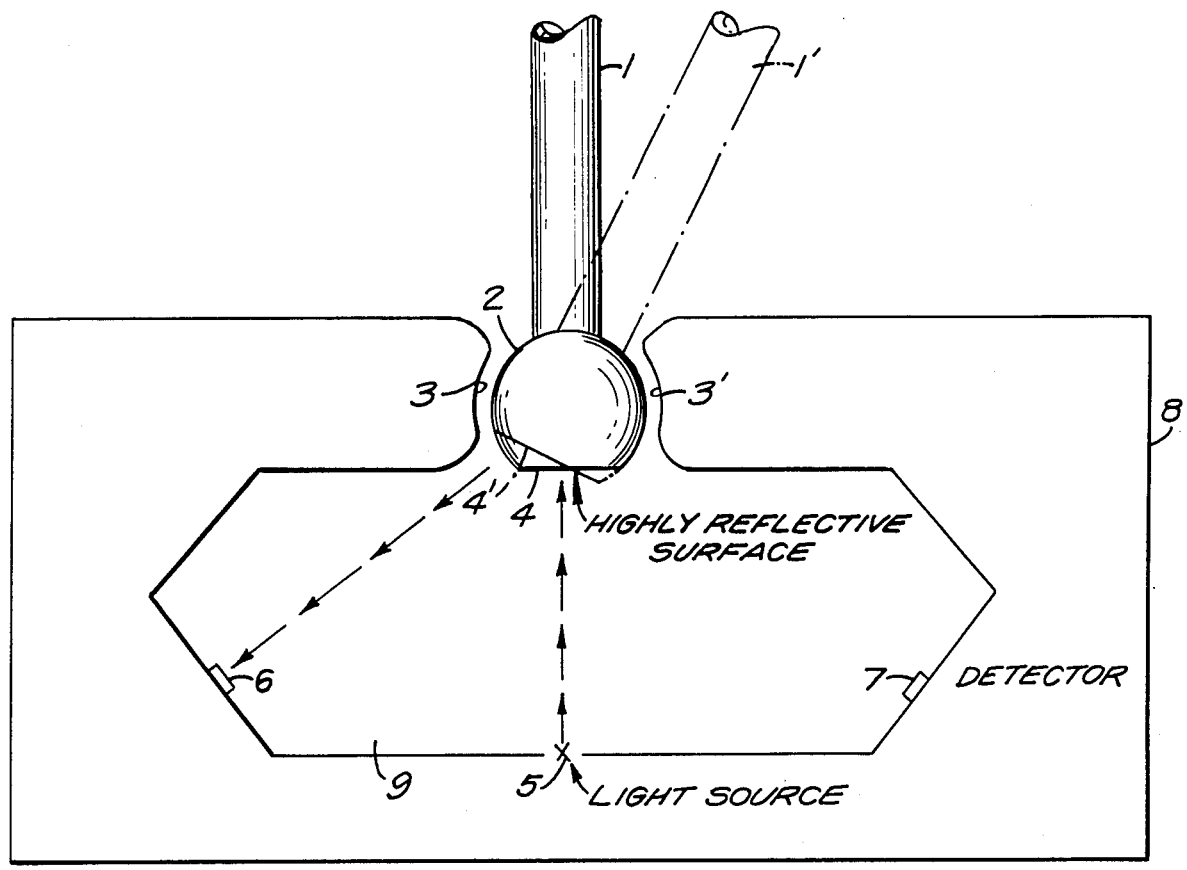
FIG. 1 is a side view of a half section of the joystick control unit.

More particularly, referring to FIG. 1, there is shown a side view of a half section of the joystick control device of the instant invention. Body 8, which can be of any convenient configuration, includes cavity 9, and in a top portion thereof, socket 3,3' into whicht he joystick ball 2 and integral joystick handle 1 are fitted. It is to be understood that socket 3,3', although being shown spaced apart from ball 2, will in actual operation, be snugly fitted against ball 2 to support the joystick ball and handle while permitting free movement of the joystick handle in any desired direction. Although not shown in FIG. 1, it should also be understood that well known techniques would be used to maintain the joystick handle in a centered upright position when not in use and to return the joystick handle to the centered upright position when it is moved off center and released. In addition, various other arrangements could be used to support the joystick handle, such as a flexible membrane or a spring arrangement, rather than the modified ball and socket arrangement shown in FIG. 1.

The bottom of ball 2, shown at 4 in FIG. 1, is a reflective surface that faces directly downward when the joystick handle is in a centered upright position and tilts as the joystick handle is moved through its plane of movement. The manner in which surface 4 tilts as the joystick handle is moved is illustrated in FIG. 1 by the positions of handle 1' and surface 4' respectively.

Centered beneath reflective surface 4 is a ligth source 5 which can be a Light Emitting Diode (LED) or equivalent. Light source 5 is fixed in position and operates continuously, while the joystick controller of FIG. 1 is in operation. Positioned within cavity 9 are a number of photo-detectors, such as detectors 6 and 7 which vary in electrical resistance in direct relation to the amount of light impinging on the detector. Therefore, it can be seen from FIG. 1, that as the joystick handle is pivoted about its center position the light beam generated by source 5 and reflected by surface 4 will move off center and direct more light to one or more of the detectors within cavity 9, while directing less light to the remaining detectors. The resistance of each of the detectors varies in direct proportion to the light received and this change in resistance is used to generate appropriate control signals in accordance with one embodiment of a control circuit discussed below. It may also be desirable in some applications of the joystick control unit to coat the interior surfaces of cavity 9 with an opaque light absorbing material to reduce spurious light reflections, and/or to provide a shroud arrangement for the LED to control beam width, and/or to provide a shroud arrangement for the reflective surface of the photodetector to aid in focusing the output from the light source.

Although only two detectors, 6 and 7, are shown in FIG. 1, it is to be understood that alternate numbers of detectors could be used in an operating joystick control unit, for example 3 or 4 detectors, or one detector for each primary direction of movement in the plane of movement of the joystick handle. It has been found that the use of four detectors, when used in conjunction with the control circuit described below, provides a highly accurate and reliable joystick control unit. However, additional detectors could be used in appropriate positions within cavity 9 to provide even greater accuracy in controlling the movement of an object or a visual image on the face of a CRT. The number and position of detectors placed within cavity 9 would, of course, vary with the particular application of the joystick control unit.

Figure 2:
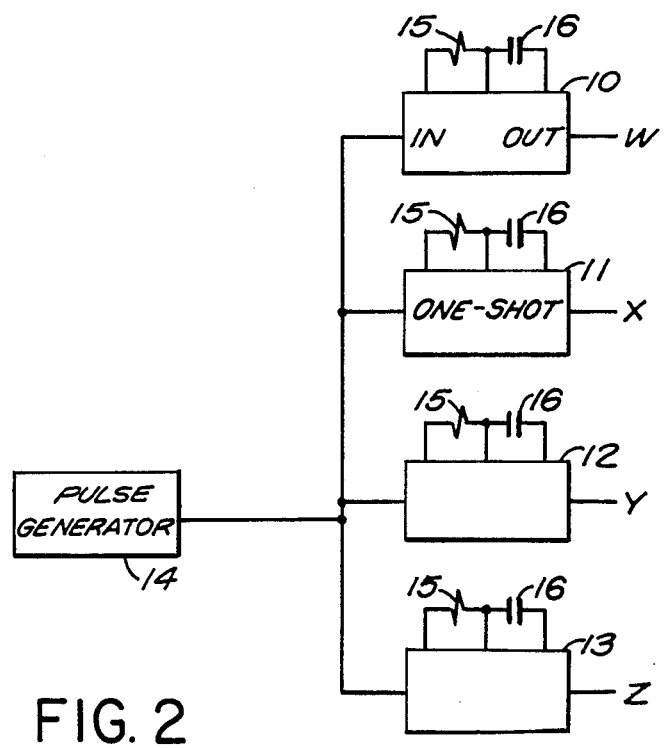
FIG. 2 is one embodiment of circuitry for generating control signals in response to movements of the joystick.

Referring now to FIG. 2, there is shown one embodiment of a circuit capable of converting the varying resistance of the detectors within cavity 9 into electrical control signals. More particularly, the circuit utilizes four retrigerable monostable multivibrators (one-shots) 10-13, one for each of four photodetectors, and a free running pulse generator 14. Although not critical, the pulse generator should produce a pulse approximately every 100 milliseconds, This pulse is fed into all four trigger inputs of the one-shots and changes the outputs of the one-shots from a low state (logical "0" level) to a high state (logical "1" level).

In a standard circuit configuration, resistor 15 and capacitor 16 determine the pulse width of the one-shot after it receives a trigger pulse. If the trigger pulse appears often enough, it is possible to prevent the output from ever returning to its low state. This is known as a retriggerable one-shot and is employed in this particular circuit configuration.

If the value of capacitor 16 is held constant and resistance of resistor 15 is allowed to vary, the pulse width of the output of the one-shot will be a direct function of the reistance. For joystick control unit applications in accordance with this invention, the photo-detectors 6, 7 etc. are inserted in place of resistor 15. The pulse width of the one-shot now produced will be a function of the current passing through the photo-detector which is a function of the amount of light the photo-detector receives.

Figure 3A:
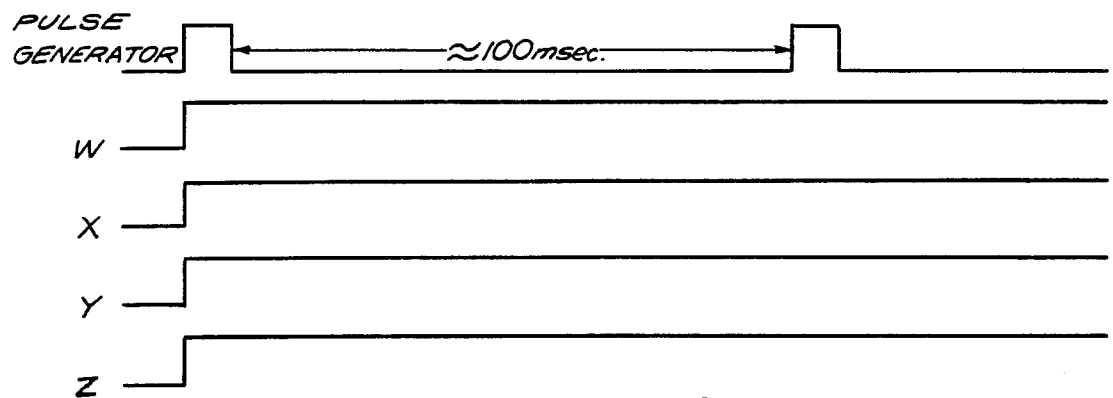
FIGS. 3a, 3b and 3c illustrate various wave forms present in the circuitry shown in FIG. 2, FIGS. 4-6 illustrate an arrangement for providing a switch control function for the joystick control unit of the instant invention and, FIG. 7 describes a further embodiment of the joystick reflectivity surface.
Figure 3B:
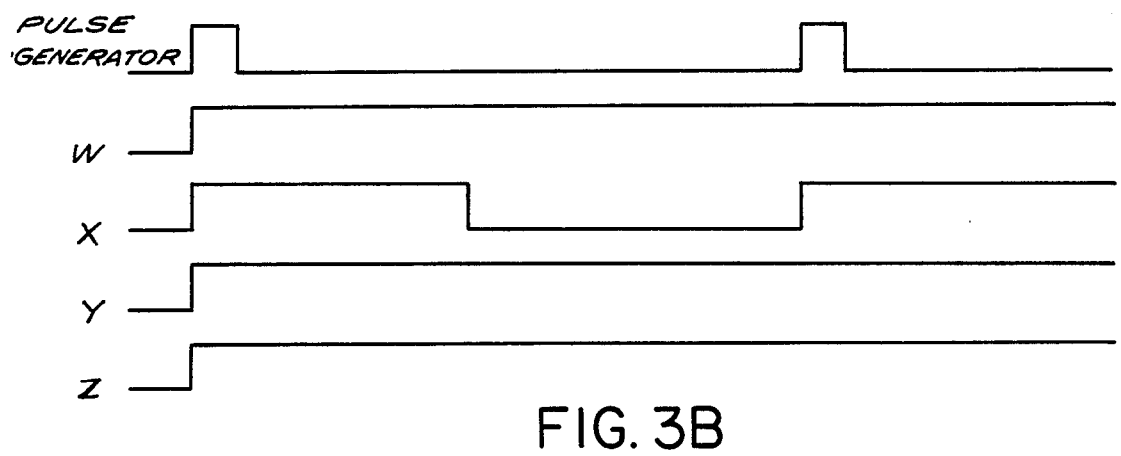
Figure 3C:
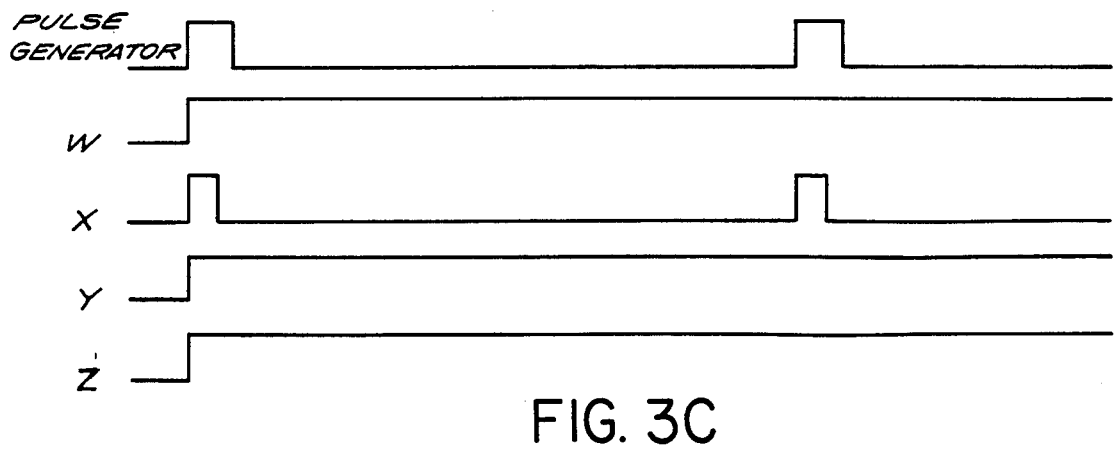

If the joystick handle is centered in the upright position (perpendicular to the base), little or no light will be directed to the various photo-detectors. This typically results in all four one-shot signals W, X, Y and Z remaining high (FIG. 2a). As the joystick handle is moved off center, at least one, but no more than two, photo-detectors will receive an increase in light intensity. This will result in at least one, and possibly two, one-shot outputs going low prior to receiving another trigger pulse (FIG. 3b). As the period of time during which the one-shot output signals remain high depends on the varying resistance of the photo-detectors, a low resistance condition ould result in the wave forms shown in FIG. 3(c) wherein the "X" output returns "low" soon after the trigger pulse. The selective outputs of the one-shots can be readily used to uniquely identify the direction of movement of the joystick handle and in turn can be utilized by additional standard circuitry (not shown) to control the movement of an object or a visual image on the face of a CRT. It is to be understood that the control circuit in FIG. 2 is only one embodiment for converting the varying resistance of the photodetectors into electrical control signals and other circuits could be used for particular applications of the joystick control unit of the instant invention. Also, of course, if it were desirable to utilize additional photo-detectors appropriately located within cavity 9, the embodiment of FIG. 2 would require additional one-shots to accomodate the additional photo-detectors.

Figure 4:
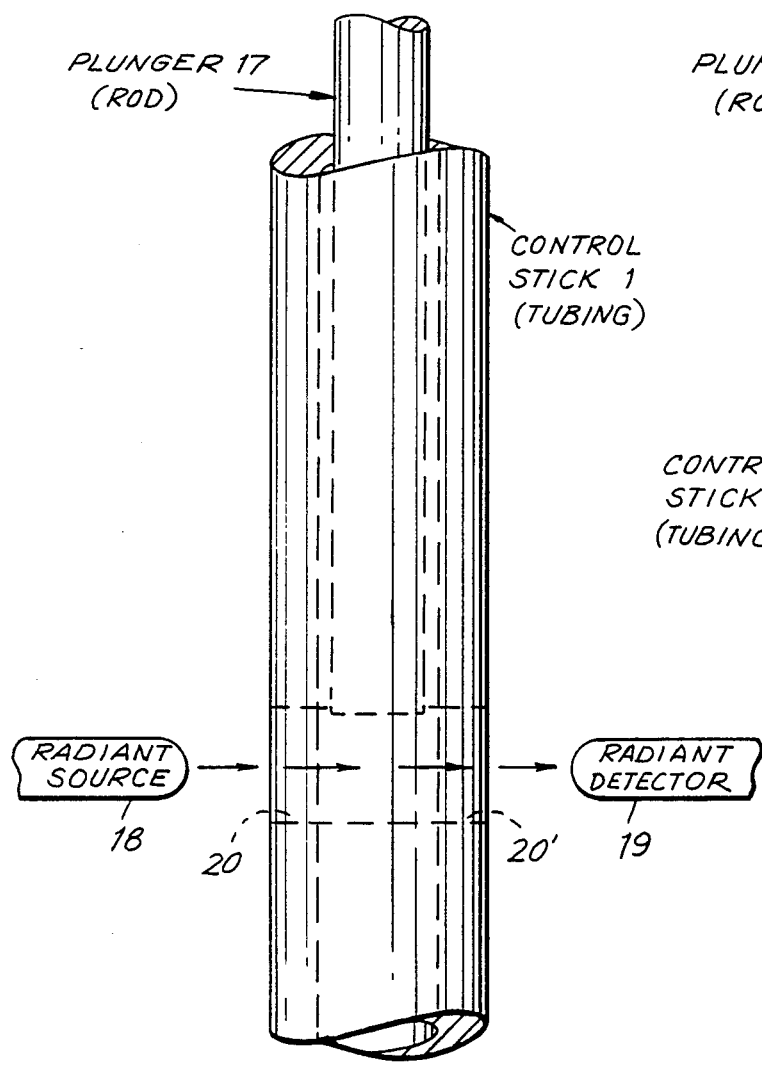
Figure 5:
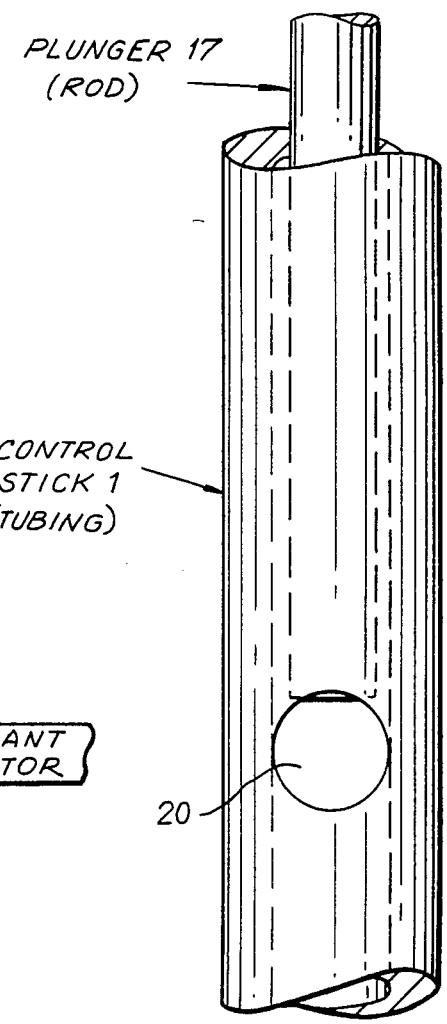
Figure 6:
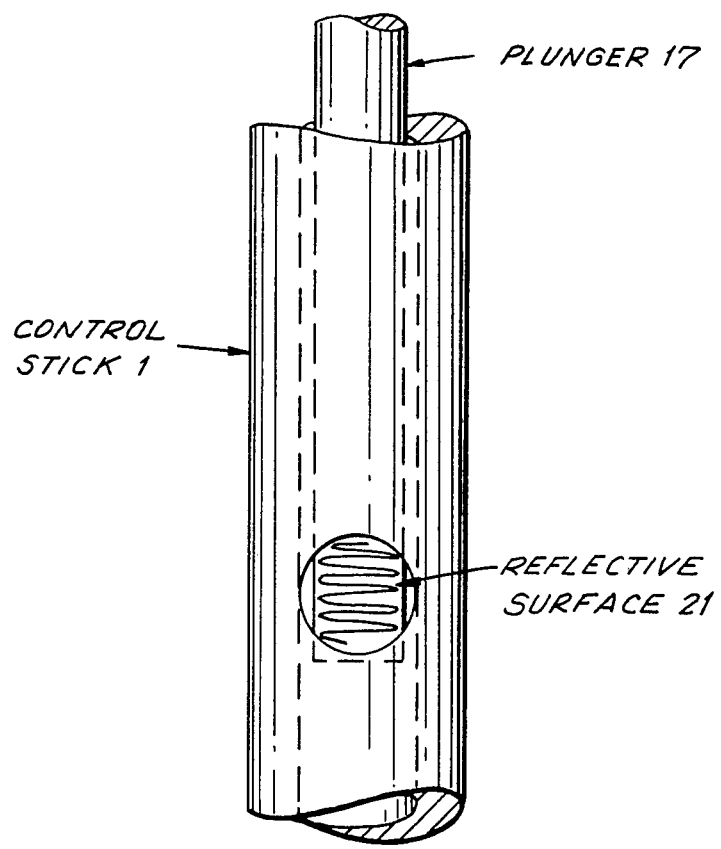

Referring now to FIGS. 4-6, there is illustrated one embodiment of the invention for providing a switch control function for use with the joystick control unit of the instant invention. In many joystick applications, such as for use with video game playing, a switch control function is preferred in addition to the control signals generated by movement of the joystick handle. Such switch control functions are typically used for "fire buttons" or similar functions. Prior art joysticks have typically achieved use of a switch control function by simply inserting a contact type switch in the joystick handle or in the base of the joystick control unit. The disadvantages inherent in the use of a contact type switch have been described above. The instant invention provides for a switch control function with enhanced reliability through use of the basic optical princpals utilized in accordance with the invention.

Control stick 1 shown in FIG. 4 comprises, for this embodiment of the invention, a hollow body contained within which is included plunger 17. Plunger 17 is moveable within the hollow portion of control stick 1 and would be retained in position through various spring type or other arrangements. Included within the upstanding sidewalls of control switch 1, are apertures 20 and 20'. FIG. 5 illustrates the relationship of aperture 20 and/or 20' with respect to control stick 1.

Positioned adjacent to aperture 20 is radiant energy source 18 which directs radiant energy through aperture 20 and 20' to radiant detector 19. In accordance with the switch control function of the invention operation of plunger 17 serves to block and/or unblock apertures 20 and 20', thus allowing or interrupting the transmission of radiant energy from the source to the detector. It is, of course, understood by one skilled in the art that appropriate circuitry associated with detector 19 can be utilized to provide a switch closure.

FIG. 6 illustrates an alternative arrangement for achieving such a switch control function. More particularly, in the embodiment shown in FIG. 6, control stick 1 has one aperture in one upstanding sidewall directly opposite the aperture. In this manner, the energy detector can be mounted adjacent to the radiant energy source. Radiant energy transmitted from the energy source will travel through the aperture, reflect from surface 21 and be returned to the radiant detector. Operation of plunger 17 permits or disrupts the transmission of radiant energy through the aperture and thus achieves the switch control functions as described in accordance with FIGS. 4 and 5.

Figure 7:
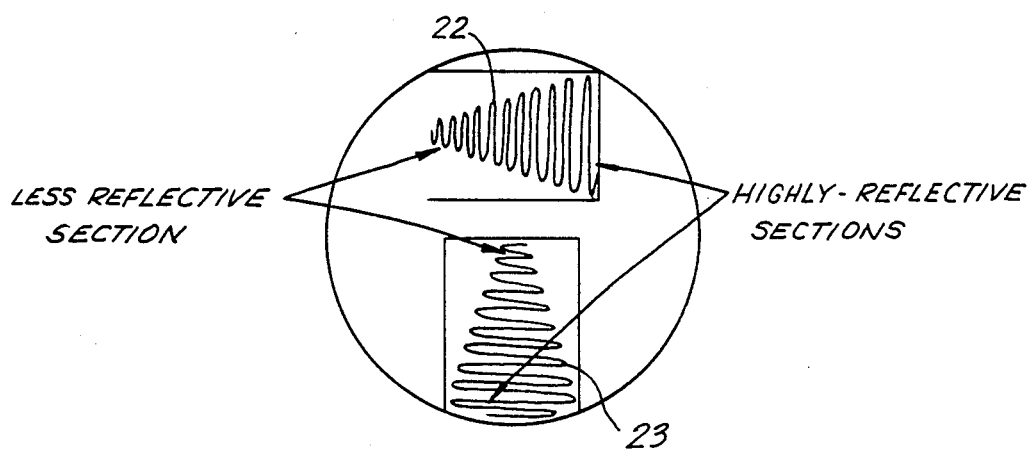

Referring now to FIG. 7, there is shown an alternate arrangement for the reflective surface referred to above, this alternative arrangement achieving the advantages of a potentiometer type joystick without the use of potentiometers.

In this embodiment, the reflective surface of FIG. 1 is replaced with a reflective surface comprising first and second reflective areas identified respectively as areas 22 and 23 in FIG. 7. Each of the reflective areas vary in reflectivity from a first portion to a second portion. For example, area 22 is highly reflective on the right side of FIG. 7 and less reflective on the left side of FIG. 7, It is understood that the degree of reflectivity between the left and right portions of area 22 will be achieved with a reflectivity gradiant, such that the degree of reflectivty will smoothly vary from a high to a lower level across area 22.

Area 23 also varies in reflectivity with the highly reflective portion being at the lower part of FIG. 7 and the less reflective portion being near the center of FIG. 7. As in FIG. 1 the radiant energy source is beneath the center of the reflective surface. As the surface is pivoted, the light intensity received by the detectors will vary depending upon the position of the control stick. The detectors will be positioned so that in the steady state case (no deflection on the joystick handle) the light intensity will be approximately one-half or maximum intensity. This arrangement emulates the use of potentiometers as the joystick is moved.

Areas 22 and 23 are shown in FIG. 7 as being orthogonal to each other. Although orthogonal placement of the area 22 and 23 is preferred, it is not required for operation of the invention.

The instant invention provides a low cost, highly reliable and highly accurate joystick control unit that overcomes the numerous disadvantages inherent in known joystick control units. The inventive joystick control unit described herein can be used in a variety of applications ranging from controlling the movement of an object with appropriate motor control circuitry or controlling the movement of a visual object on the face of a CRT. Various interface circuits can be used to convert the varying resistance of the photo-detectors described herein into electrical control signals with the nature of the interface circuit being dependent upon the particular application of the joystick.

The foregoing disclosure and description of the invention is illustrative and explanatory thereof and various changes is size, shape and materials, as well as in the details of the illustrated construction may be made within the scope of the appended claims without departing from the spirit of the invention.

I claim:
1. A joystick control unit comprising,
  means for manually tilting a reflective surface through an X-Y plane,
  means mounted beneath said reflective surface for generating radiant energy, said reflective surface operating to reflect energy from said radiant energy generating means,
  means for detecting reflected energy from said reflective surface, the level of radiant energy received by selected ones of said detecting means varying as said reflective surface is tilted, and means responsive to changes in the level of reflected energy received by said detecting means for generating control signals, wherein said reflective surface comprises at least first and second reflective areas, each of said reflective areas varying in reflectivity from a first level of reflectivity in one portion of said reflective area to a second level of reflectivity in another portion of said reflective area, said first level of reflectivity being greater than said second level of reflectivity.

2. A joystick control unit in accordance with claim 1 wherein said first and second reflective areas are orthogonal to each other.

3. A joystick control unit in accordance with claim 1 wherein said tilting means includes a joystick shaft member supported by supporting means, said reflective surface being positioned on a lower portion of said supporting means.

4. A joystick control unit in accordance with claim 1 wherein said generating means includes a light source.

5. A joystick control unit in accordance with claim 1 wherein said detecting means includes a photo-detector.

6. A joystick control unit in accordance with claim 3 wherein, an upper portion of said joystick shaft member comprises a hollow body with upstanding sidewalls, at least one aperture in said upstanding walls, a moveable member included within said hollow body and a radiant energy source for directing radiant energy through said aperture, said movable member being selectively operable to either prevent radiant energy from passing through said aperture or to permit radiant energy to pass through said aperture.

7. A joystick control unit in accordance with claim 6 wherein there is further included a reflective surface on a sidewall adjacent to the sidewall containing said aperture and a radiant energy detector arranged to detect radiant energy reflected from said reflective surface.

8. A joystick control unit in accordance with claim 6 wherein opposing sidewalls in said hollow body each include apertures, a radiant energy source arranged to direct radiant energy through a first one of said apertures and a radiant energy detector arranged to detect radiant energy received through a second one of said apertures.

* * * * *